United States Patent Office 3,115,889
Patented Dec. 31, 1963

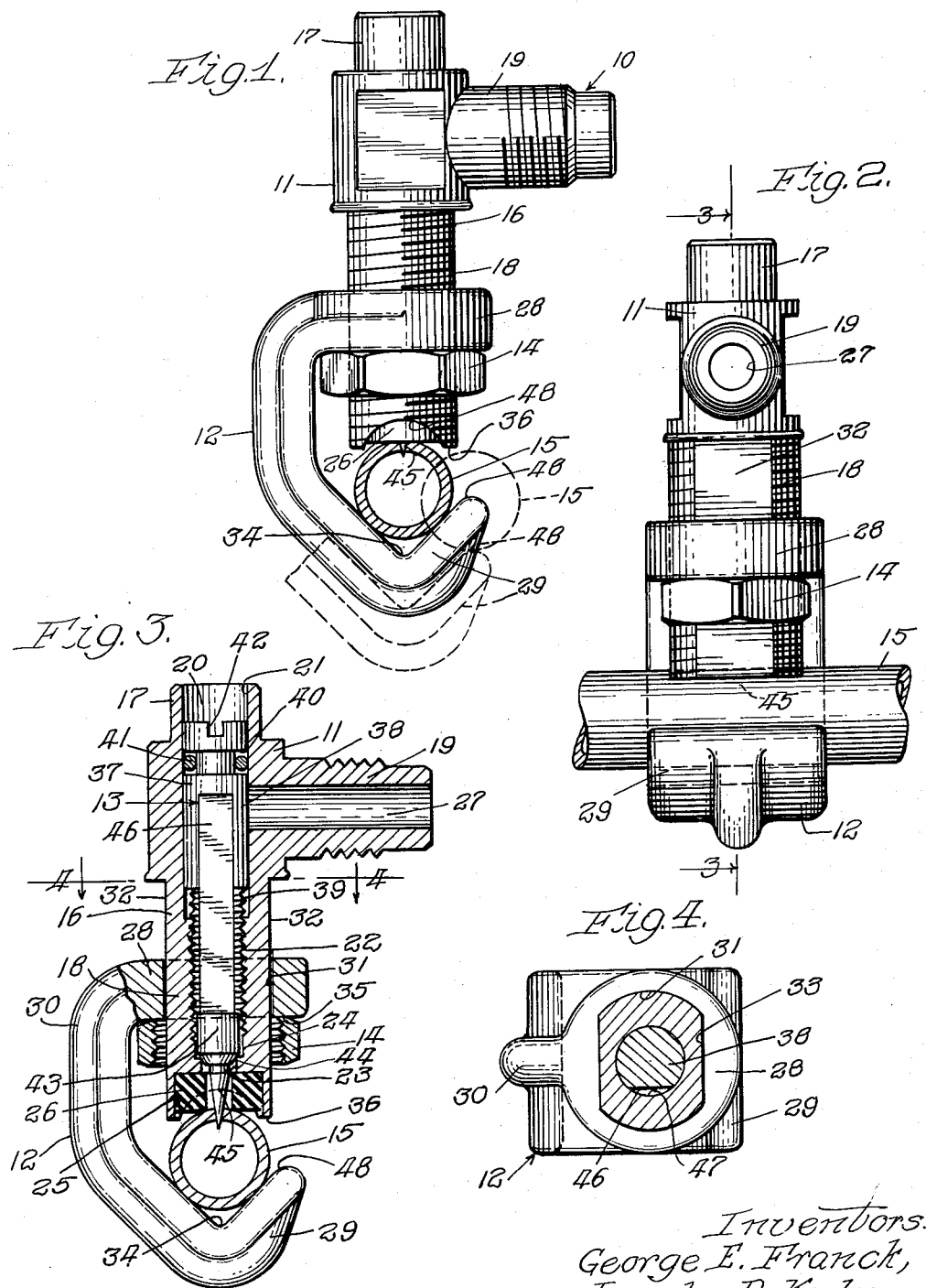

3,115,889
LINE TAPPING VALVE
George E. Franck, Morton Grove, and Joseph D. Kody, Arlington Heights, Ill., assignors to Imperial-Eastman Corporation, a corporation of Illinois
Filed Dec. 27, 1960, Ser. No. 78,759
4 Claims. (Cl. 137—318)

This invention relates to valves, and in particular to line tapping valves.

A conventional method of tapping into a tubular conduit, as for testing, purging, or connecting, the systems in which the conduit is incorporated, is to install a piercing valve on the conduit at the desired point. Such valves conventionally are arranged to clamp onto the conduit and include a piercing needle which is forced through the conduit wall. Suitable sealing means are associated with the valve so that when the needle is withdrawn, fluid may be selectively delivered to or withdrawn from the conduit as desired. Upon completion of the desired operation, the valve is adjusted to the closed position, remaining secured to the conduit.

The present invention comprehends a new and improved piercing valve providing improved facilitated installation and use. Thus, the principal object of the present invention is to provide a new and improved line tapping valve.

Another object of the invention is to provide such a valve having improved means for mounting the valve on a tubular conduit.

A further object of the invention is to provide a valve wherein the mounting means may be readily slipped about a portion of the tubular conduit permitting facilitated installation from one side of the conduit.

Still another object of the invention is to provide such a valve having a new and improved valve element cooperating with the mounting means in a novel manner to provide facilitated piercing of the tubular conduit and control of fluid flow selectively to and from the conduit subsequent to the piercing thereof.

Other features and advantages of the invention will be apparent from the following description taken in connection with the accompanying drawing wherein:

FIGURE 1 is a side elevation of a piercing valve embodying the invention, installed on a portion of a tubular conduit, a first step in the association of the valve with the conduit being indicated in dotted lines;

FIGURE 2 is a front elevation thereof;

FIGURE 3 is a vertical section taken substantially along the line 3—3 of FIGURE 2; and FIGURE 4 is an enlarged, transverse section taken substantially along the line 4—4 of FIGURE 3.

In the exemplary embodiment of the invention as disclosed in the drawing, a piercing valve generally designated as 10 is shown to comprise a body 11, a yoke 12, a valve means 13, and a nut 14 cooperatively associated with the body 11 and yoke 12 to secure the valve 10 to a tubular conduit 15 for tapping the same.

More specifically, the valve body 11 includes an elongated tubular portion 16 having a cylindrical outer portion 17 and a threaded inner portion 18. Between portions 17 and 18, the body is provided with a branch portion 19 which is exteriorly threaded for connection thereto of a suitable conduit (not shown). Extending axially through the body is a stepped bore 20 having a cylindrical outer end 21, a reduced-diameter threaded mid-portion 22, a further-reduced-diameter cylindrical inner portion 23, and a radial shoulder 24 between portions 22 and 23 defining an annular valve seat. The inner end portion 23 of the bore opens inwardly coaxially into a cylindrical recess 25 in which is carried an annular gasket 26.

Branch portion 19 of the valve body is provided with a branch bore 27 communicating at one end with bore portion 21.

Yoke 12 includes a first leg 28 and a second V-shaped leg 29 spaced from leg 28 by a bight portion 30. First leg 28 is provided with an opening 31 freely receiving body threaded portion 18, said opening having a cross-section defined by a portion of a circle between a pair of equilinear parallel chords as shown in FIGURE 4. Body threaded portion 18 is correspondingly provided with a pair of diametrically opposite, parallel flats 32 slidably engaging the flat surfaces 33 of the opening 31, thereby precluding rotation of the body in the opening 31 while permitting ready longitudinal movement of the body therethrough. The apex 34 of the V-shaped leg 29 is coaxially aligned with the axis of opening 31 so that when the tubular conduit 15 is seated in the V-shaped leg 29, the axis of the tubular conduit perpendicularly intersects the axis of the bore 20 of the valve body 11.

Nut 14 is threadedly mounted on the body threaded portion 18 between yoke legs 28 and 29 thereby retaining the body in association with the yoke. Further, the nut 14 cooperates with the inner surface 35 of the leg 28 to draw the body inner end 36 toward the leg 29 as the nut is threaded outwardly on the threaded portion 18.

Valve means 13 includes a stem 37 including an outer cylindrical portion 38 fitted in and longitudinally slidable in cylindrical bore portion 21, and an inner threaded portion 39 threaded into the threaded bore portion 22. Adjacent its outer end, the stem is provided with an annular groove 40 in which is received an O-ring 41 for sealing the outer end of the stem to the valve body outwardly of the connection of branch bore 27 to the bore 20. A diametric slot 42 is provided in the outer end of the valve stem for cooperation with a tool such as a screwdriver (not shown) to thread the threaded portion 39 in bore portion 22 and thereby adjust the axial position of the valve stem.

At its lower end, the valve stem is provided with a cylindrical portion 43 including a frustoconical end surface 44 arranged to have seating engagement with the annular valve seat 24 at the innermost position of the valve stem. A piercing needle 45 is coaxially secured to the lower end portion 43 to project therefrom and through recess 25, when the valve is in the closed condition with the surface 44 seating on valve seat 24. As shown in FIGURE 3, the internal diameter of sealing gasket 26 is greater than the diameter of needle 45 permitting free movement of the needle therethrough into engagement with the wall of the conduit 15.

As best seen in FIGURES 3 and 4, the valve stem 38 is provided with a flat 46 extending longitudinally outwardly from the enlarged portion 43 to adjacent groove 40, thereby defining in the bore 20 a flow passage 47 providing communication between the branch bore 27 and the bore portion 23 when the valve surface 44 is spaced from the valve seat 24.

As indicated above, the piercing of tubular conduit 15 is effected by urging the body end 36 toward the jaw 29. As shown in FIGURE 3, sealing gasket 26 is recessed from the inner end 36 of the body. To permit the conduit to move into firm sealing association with the gasket concurrently with the piercing thereof by needle 45, the lower end 36 of the body is provided with a pair of diametrically opposite downwardly opening arcuate cut-outs 48. Thusly, the tubular conduit 15 is more effectively retained in seated association with the V-shaped leg 29 of the yoke 30 as the recessed arrangement of the sealing gasket 26 provides improved resistance to lateral movement of the conduit.

Installation of the piercing valve 10 on the tubular conduit 15 is extremely simple. Preparatory to the installation, the nut 14 is threaded inwardly on the threaded portion 18 permitting the body to be moved outwardly through the yoke opening 31 until inner end 36 is spaced from the distal end 49 of the leg 29 a distance greater than the outer diameter of the conduit 15, as shown in dotted lines in FIGURE 1. The valve means 13 is rectrogradedly threaded to an upper position wherein the needle 45 is retracted to above the lower surface of the gasket 26. The adjustment of the valve means is effected by simple rotation of the valve stem as by engagement of a screwdriver with the valve stem in slot 42. Relative movement of the valve and conduit 15 is then effected as by hooking the yoke 12 about the conduit to dispose the conduit in alignment with the axis of bore 20 and apex 34 of the leg 29. Nut 14 is then outwardly threaded on body portion 18 to effect relative movement of yoke leg 29 and body end 36 to the full line position thereof in FIG. 1. As the body is urged inwardly toward the conduit, the gasket 26 is urged into sealing engagement with the conduit wall. The valve 13 is now threadedly advanced to move the piercing needle 45 through the wall of the conduit, with the gasket 26 circumjacent the pierced opening providing a sealed connection of the conduit to the valve body. Body branch 19 may be connected to a suitable source or receiver of fluid as desired prior to the piercing of the conduit and the valve means may now be adjusted to space the valve element surface 44 from the valve seat 24 sufficiently to permit desired fluid flow between branch bore 27 and the interior of the conduit 15.

To reclose the valve 10, the valve stem is simply inwardly threaded to reseat the surface 44 on valve seat 24. Thus, the valve may be allowed to remain on the conduit for further use as desired.

Thus, valve 10 provides a simple, economical valve structure adapted for installation at any point in a line formed of conduit, such as thin wall, soft copper or aluminum tubing. The facilitated mounting of the valve on the conduit permits installation thereof in areas where access to the line is relatively restricted, such as where the conduit is disposed closely adjacent a wall surface. As the installation of the valve on the conduit may be effected from one side of the line, as illustrated in FIGURE 1 of the drawing, only a minimum clearance need be provided at the opposite side of the conduit between the conduit and the adjacent wall. Further, as the movement of the yoke about the conduit is permitted without disassociating the yoke from the body of the valve, further facilitation of the installation is obtained.

While we have shown and described one embodiment of our invention, it is to be understood that it is capable of many modifications. Changes, therefore, in the construction and arrangement may be made without departing from the spirit and scope of the invention as defined in the appended claims.

We claim:

1. A piercing valve for tapping a tubular conduit, comprising: a body having an inner end, and a flow passage therethrough including a through bore, said body further having a peripheral threaded portion; means defining a branch bore extending laterally from the through bore; a yoke having a first leg provided with an opening coaxially receiving said body, and a second leg spaced from said first leg and provided with means for supporting a tubular conduit with its axis perpendicularly intersecting the axis of said through bore, said inner end of the body being disposed between said yoke legs; a nut threaded to the threaded peripheral portion of the inner end of said body between said yoke legs; a valve means in said through bore, and including a piercing needle projecting inwardly from the body bore when the valve means is closed; annular sealing means at the inner end of the body sealing the body to the conduit circumjacent the piercing needle; sealing means closing the through bore outwardly of the branch bore; and cooperating means on said body and first leg precluding rotation of said body in said opening.

2. The piercing valve of claim 1 wherein said cooperating means positions said branch bore to open in the same general direction as said yoke opens.

3. The piercing valve of claim 1 wherein said valve means includes a valve stem having an operating portion disposed fully within said body.

4. The piercing valve of claim 1 wherein the yoke is C-shaped and the spacing between the distal ends of said legs is approximately equal to the total of the thickness of said nut and the diameter of the largest conduit which the valve is adapted to tap.

References Cited in the file of this patent

UNITED STATES PATENTS

| | | |
|---|---|---|
| 1,684,784 | Weller | Sept. 18, 1928 |
| 2,392,059 | O'Neil | Jan. 1, 1946 |
| 2,732,169 | Matto | Jan. 24, 1956 |
| 2,827,913 | Wagner | Mar. 25, 1958 |
| 2,875,777 | Lacart | Mar. 3, 1959 |
| 2,908,958 | Arndt | Oct. 20, 1959 |

FOREIGN PATENTS

| | | |
|---|---|---|
| 59,407 | Austria | of 1913 |